(12) United States Patent
Lin

(10) Patent No.: US 8,656,968 B2
(45) Date of Patent: Feb. 25, 2014

(54) SNOW PROTECTION DEVICE

(76) Inventor: Han-Chun Lin, Taichung (TW)

( * ) Notice: Subject to any disclaimer, the term of this patent is extended or adjusted under 35 U.S.C. 154(b) by 297 days.

(21) Appl. No.: 13/073,958

(22) Filed: Mar. 28, 2011

(65) Prior Publication Data
US 2012/0247629 A1 Oct. 4, 2012

(51) Int. Cl.
B65D 65/22 (2006.01)
(52) U.S. Cl.
USPC .............. 150/168; 160/370.21; 296/95.1
(58) Field of Classification Search
USPC ......... 150/156, 158, 166, 168; 296/95.1, 136, 296/1, 136.11; 160/370.21
See application file for complete search history.

(56) References Cited

U.S. PATENT DOCUMENTS

| | | | | |
|---|---|---|---|---|
| 2,595,833 A * | 5/1952 | Flaherty | ................. | 160/369 |
| 3,263,736 A * | 8/1966 | Macomson | ............. | 160/370.21 |
| 3,415,214 A * | 12/1968 | Goldman | ................. | 114/72 |
| 3,563,594 A * | 2/1971 | London | ................. | 293/128 |
| 3,751,100 A * | 8/1973 | Keyes | ................. | 150/168 |
| 3,964,780 A * | 6/1976 | Naidu | ................. | 150/168 |
| 4,635,993 A * | 1/1987 | Hooper et al. | ............. | 296/95.1 |
| 4,736,980 A * | 4/1988 | Eubanks | ................. | 160/370.22 |
| 4,903,748 A * | 2/1990 | Foraker | ................. | 160/370.21 |
| 5,564,770 A * | 10/1996 | Smith et al. | ................. | 296/95.1 |
| 6,578,900 B1 * | 6/2003 | Riportella | ............. | 296/136.12 |
| 2009/0261614 A1 * | 10/2009 | Haas | ................. | 296/95.1 |
| 2010/0224040 A1 * | 9/2010 | Svengalis | ................. | 83/13 |

* cited by examiner

Primary Examiner — Sue A Weaver
(74) Attorney, Agent, or Firm — Leong C. Lei

(57) ABSTRACT

A snow protection device mainly includes a piece of waterproof cloth, two bars, and at least two rubber magnets. The waterproof cloth includes a piece of cloth that is light-weighted, windable, and resistant against penetration of water. The two bars are respectively mounted to opposite side edges of the waterproof cloth. The rubber magnets are of magnetic attraction and are flexible and are arranged on the waterproof cloth at locations adjacent to and beside the bars. As such, the two bars can be used to collapse and expand the waterproof cloth and the rubber magnets may be securely attached, by means of magnetic attraction, to locations around a windshield so as to securely hold the waterproof cloth in position. The waterproof cloth is thus set to shield and cover the windshield. The resistance against water penetration of the waterproof cloth prevents water from contacting and being frozen on the windshield.

3 Claims, 7 Drawing Sheets

SNOW PROTECTION DEVICE

TECHNICAL FIELD OF THE INVENTION

The present invention generally relates to an automobile accessory, and more particularly to a snow protection device that prevents snow from being frozen on and fixed to automobile windshield.

DESCRIPTION OF THE PRIOR ART

In snowing areas, for any car parked outdoors, when the car was just parked, due to the temperature of the car body being still higher than the surrounding temperature, snow that falls on the windshield of the car will be at least partly melted by the temperature of the windshield and then frozen again to form a thin layer of ice sticking on the windshield. Snow that subsequently falls may deposit on the ice layer.

When a user attempts to use the car may remove the snow deposited on the ice layer easily, but the thin layer of ice that is formed by the snow that were deposited on the windshield first is fixedly stuck to the windshield. It is often hard to remove such a layer of ice from the windshield. Additional tools are required to remove the ice layer, but this may cause damage to the glass of the windshield. Such a damaged windshield may undesirably hinder eyesight of the driver in driving the car and may thus lead to traffic accidents.

SUMMARY OF THE INVENTION

In view of such a problem, an objective of the present invention is to provide a snow protection device, which effectively prevents snow from sticking to an automobile windshield and allows of easy and complete removal of snow deposited on the windshield without causing damage to the windshield.

The present invention provides a snow protection device, which mainly comprises a piece of waterproof cloth, two bars, and at least two rubber magnets. The waterproof cloth comprises a piece of cloth that is light-weighted, windable, and resistant against penetration of water. The two bars are respectively mounted to opposite side edges of the waterproof cloth. The two rubber magnets are of magnetic attraction and are flexible and are arranged on the waterproof cloth at locations adjacent to and beside the bars. As such, the two bars can be used to collapse and expand the waterproof cloth and the rubber magnets may be securely attached, by means of magnetic attraction, to locations around a windshield so as to securely hold the waterproof cloth in position. The waterproof cloth is thus set to shield and cover the windshield. The resistance against water penetration of the waterproof cloth prevents water from contacting and being frozen on the windshield.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2A is an enlarged view of a portion of FIG. 2.

FIG. 4A is an enlarged view of a portion of FIG. 4.

FIG. 5A is an enlarged view of a portion of FIG. 5.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
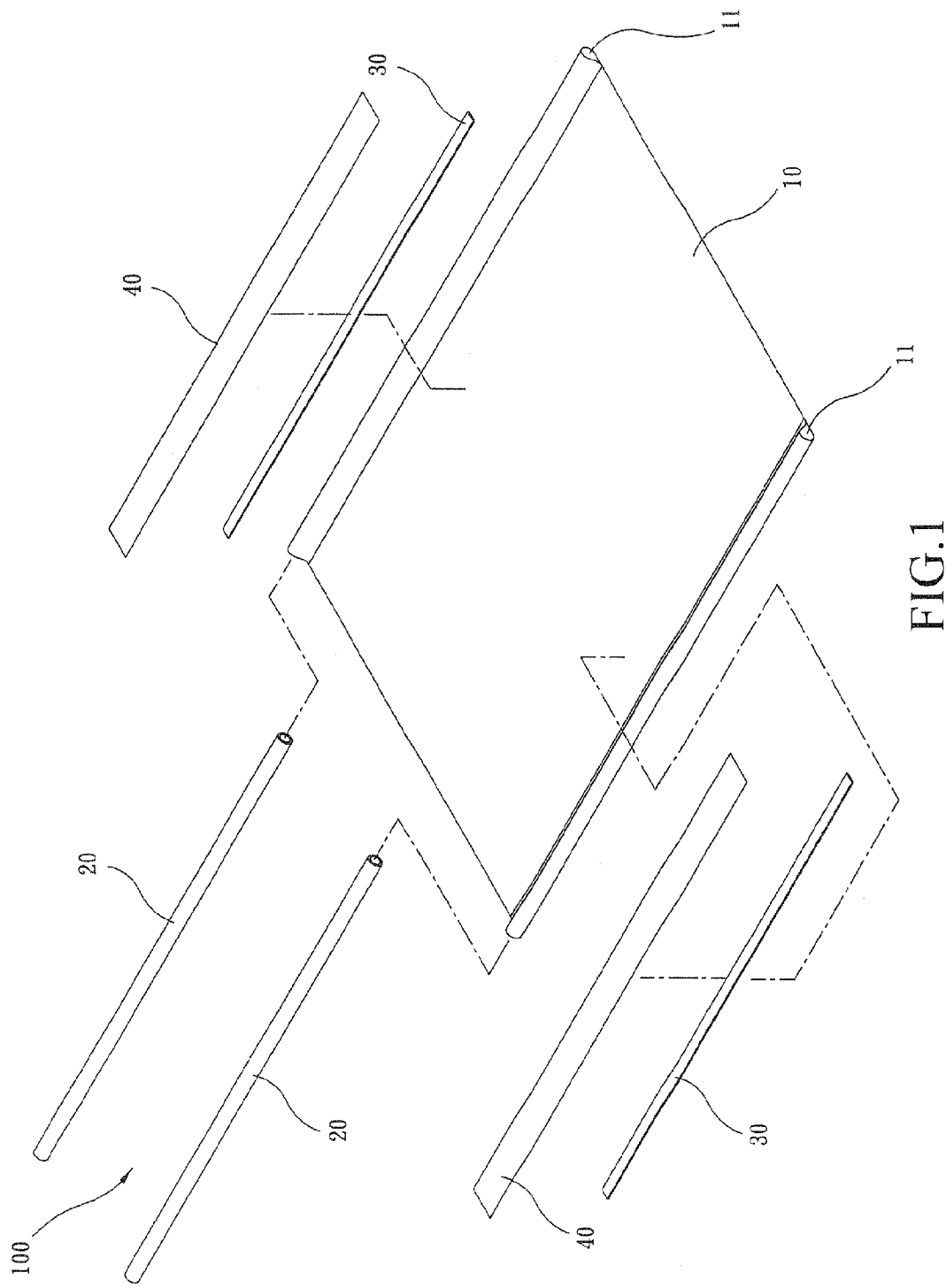
FIG. 1 is an exploded view of a first preferred embodiment according to the present invention.
Figure 2:
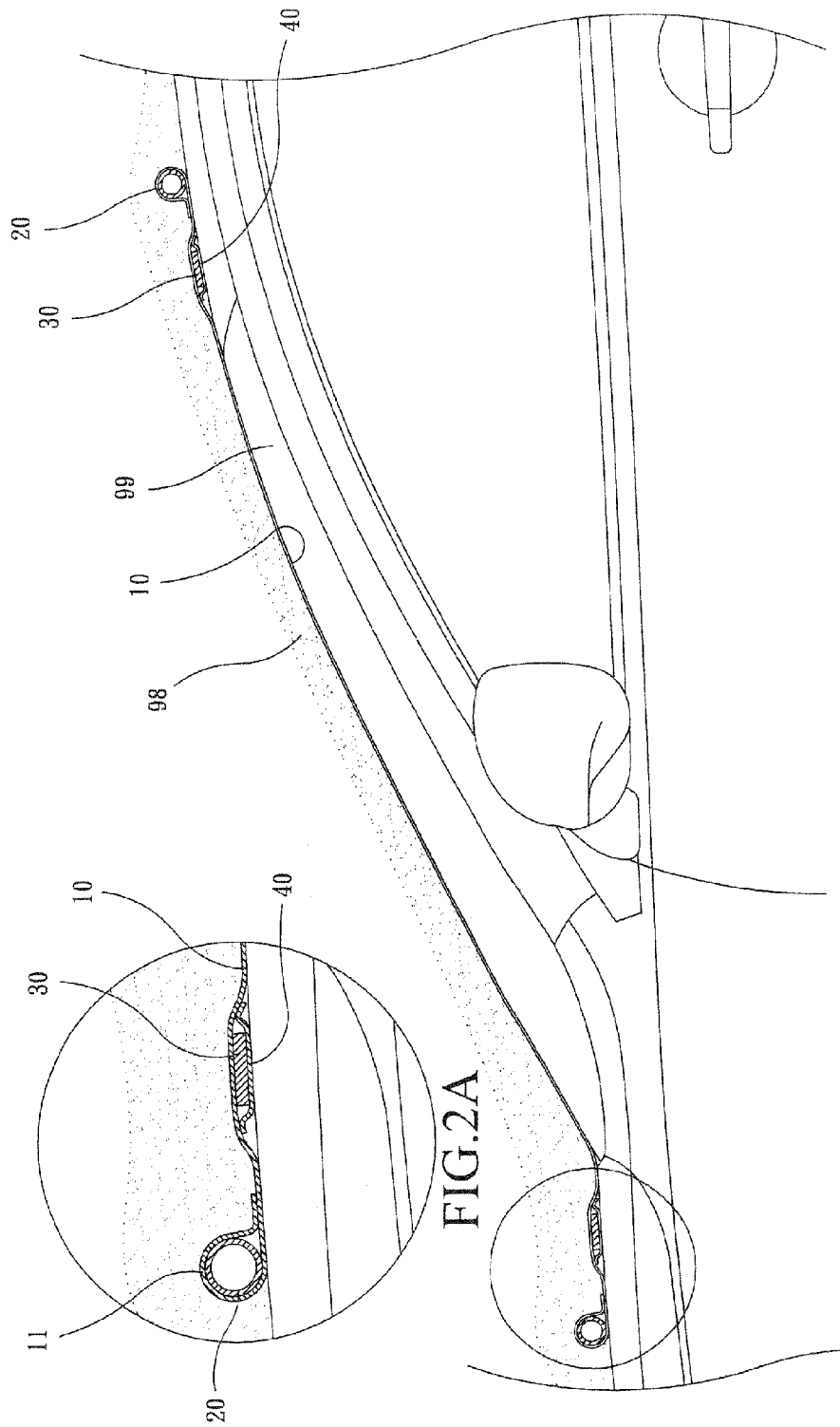
FIG. 2 is a schematic view illustrating the use of the embodiment shown in FIG. 1.

Referring to FIGS. 1 and 2, a snow protection device 100 constructed in accordance with a first preferred embodiment according to the present invention is shown. The snow protection device of the present invention comprises a piece of waterproof cloth 10, two bars 20, and two rubber magnets 30.

Referring to FIGS. 1 and 2, the waterproof cloth 10 comprises a piece of cloth that is light-weighted, is windable, and is resistant to water penetration. The waterproof cloth 10 has a predetermined surface area.

Referring to FIGS. 1 and 2, the two bars 20 are preferably circular hollow bars having a predetermined length. The two bars 20 are respectively mounted to opposite side edges of the waterproof cloth 10.

Referring to FIGS. 1 and 2, the two rubber magnets 30 are of property of magnetic attraction and are flexible, and are attached to the waterproof cloth 10 at locations adjacent to and beside the two bars 20.

The above described are components, as well as assembling thereof, that constitute the snow protection device 100 according to the first preferred embodiment of the present invention. The operation of the snow protection device will be described as follows:

Firstly, to use the present invention, the waterproof cloth 10 is stretched to expand in such a way that the two bars 20 at the opposite edges of the waterproof cloth 10 respectively extend beyond top edge and bottom edge of a windshield 99 of an automobile, whereby the waterproof cloth 10 completely cover and shield the windshield 99 of the automobile with the two rubber magnets 30 being respectively in magnetic attraction with and thus attached to metal parts of the automobile above and below the windshield 99. For example, the two rubber magnets 30 may be attached by magnetic attraction to roof and hood of the automobile to securely keep the waterproof cloth 10 covering and shielding the windshield 99 of the automobile (see FIGS. 2 AND 2A).

Figure 3:
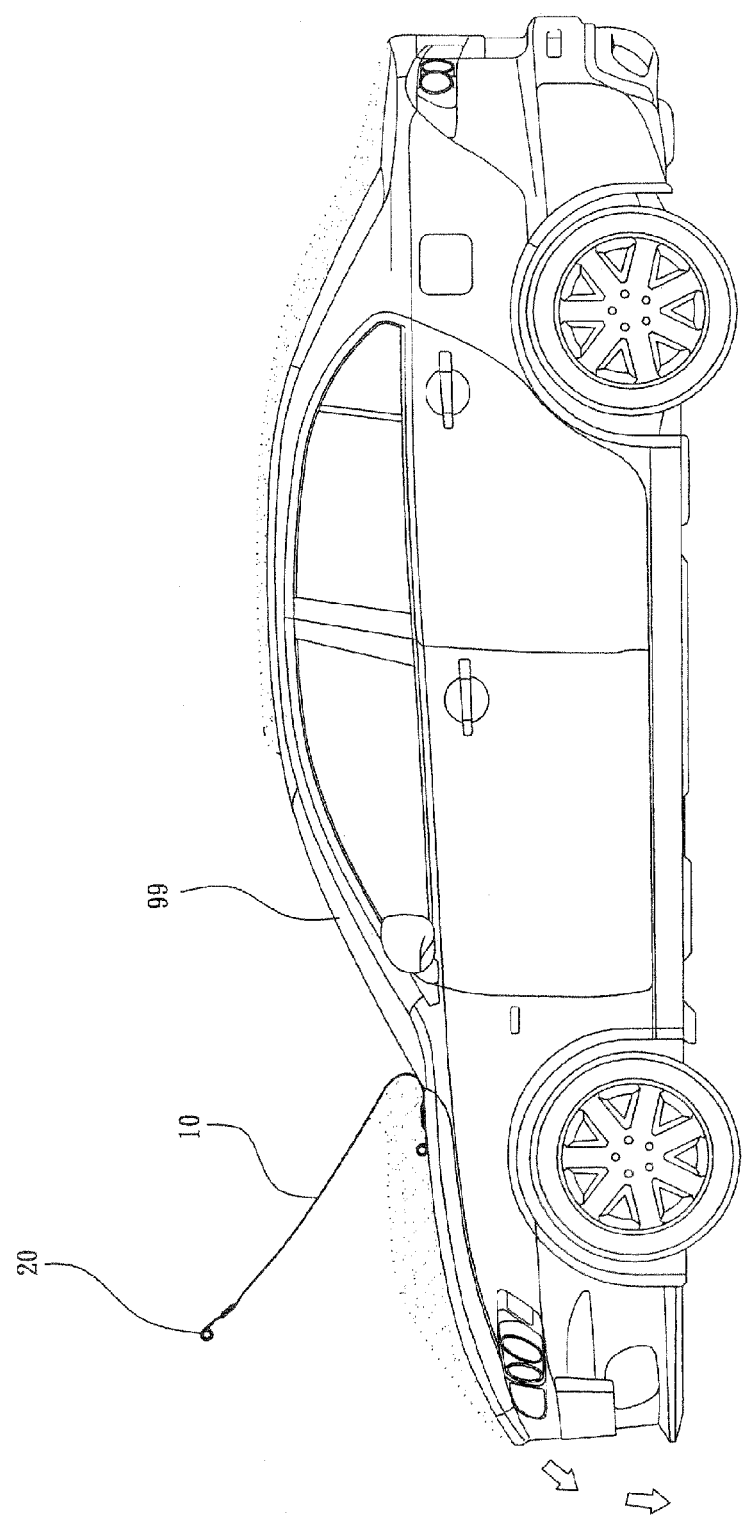
FIG. 3 is also a schematic view illustrating the use of the embodiment shown in FIG. 1.

In this way, since the waterproof cloth 10 is resistant penetration of water, water formed by melting of snow 98 falling on the waterproof cloth 10 is prevented from penetration through the waterproof cloth 10 to contact and stick to the windshield 99. Although the melted water of the snow 98 falling on the waterproof cloth 10 stays on and is frozen again on the outside surface of the waterproof cloth 10, any water so frozen can be effectively isolated from the windshield 99. When a driver attempts to use the automobile, the driver can simply pull up one of the bars 20 (as shown in FIG. 3). It is preferable that the one of the bars 20 that is set on the top edge of the windshield 99 is first pulled and lifted up. In this way, all the snow depositing on the waterproof cloth 10 can be removed off the waterproof cloth 10 at the same time when the bar is lifted up. No ice formed by frozen snow may occur on the windshield 99, so that no tool is required to shave off the ice and thus no damage of the windshield by such an operation may occur. Driving safety may then be enhanced.

Further, the waterproof cloth 10 is preferably of a length that is greater than the length of the bars 20 and is also greater than the length of the rubber magnets 30. Preferably, the bars 20 are of the same length as the rubber magnets 30. With this arrangement, the waterproof cloth 10 can effectively shield the whole windshield.

Further, the waterproof cloth 10 forms a receiving hole 11 in each of the side edges thereof. The receiving hole 11 is formed by folding the side edge of the waterproof cloth 10 by a predetermined distance and then fixing the side edge to the cloth (by means of for example sewing or adhesives). The receiving holes 11 so formed receive and retain the bars 20 therein.

Further, the present invention may further comprise two pieces of enclosure cloth 40, which are respectively set over the rubber magnets 30. A circumference of each enclosure cloth 40 is attached to the waterproof cloth 10 (by means of sewing or adhesives) to securely retain the rubber magnet 30 in position on the waterproof cloth 10. Of course, the enclosure cloth 40 may also be made of a piece of cloth that is light-weighted, windable, and resistant against water penetration.

To store the snow protection device 100 according to the present invention, the two bars 20 are rolled to wind the waterproof cloth 10 thereon, whereby the overall volume is reduced, but re-expansion is easy.

Figure 4:
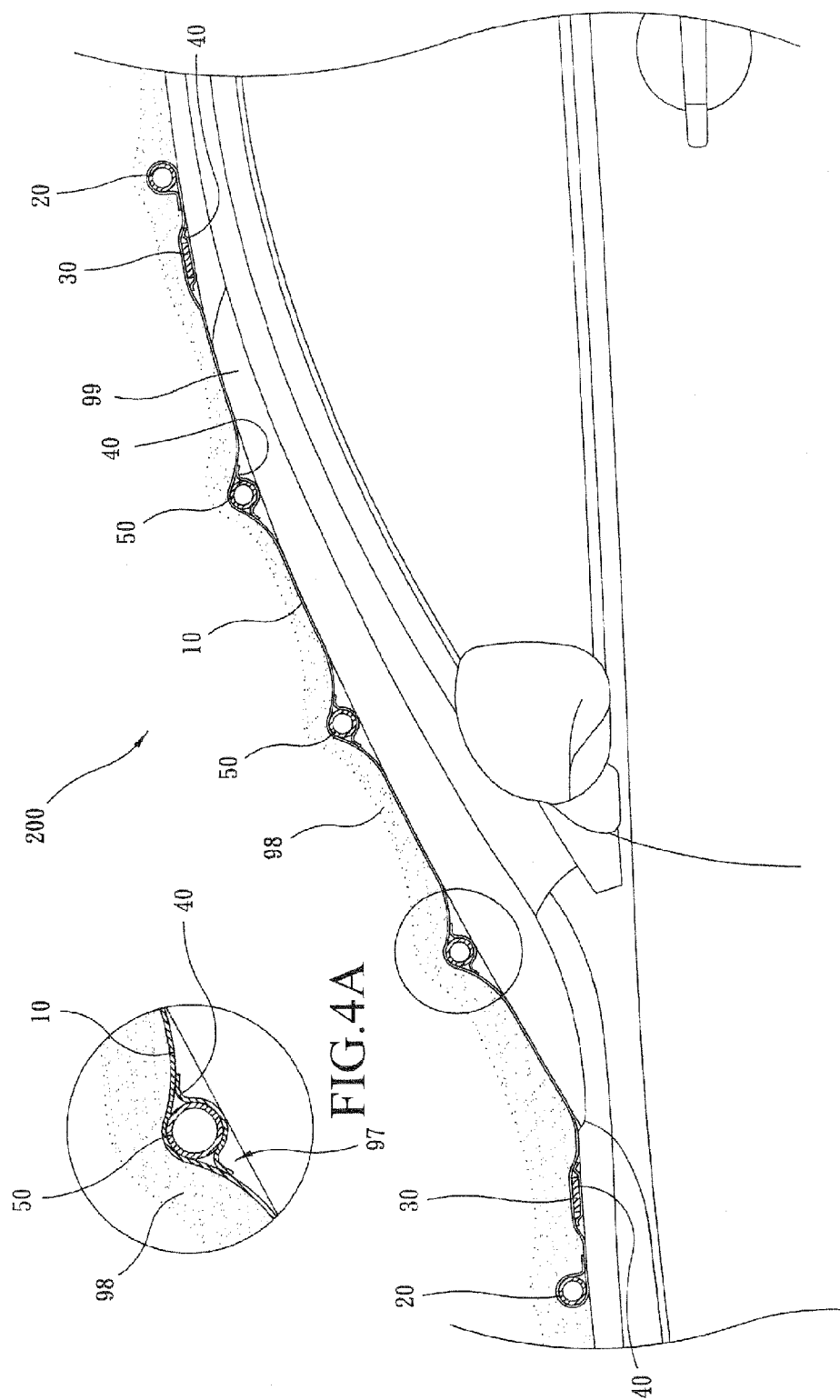
FIG. 4 is a schematic view illustrating the use of a second preferred embodiment according to the present invention.

Referring to FIGS. 4 AND 4A, a snow protection device 200 constructed in accordance with a second preferred embodiment of the present invention is shown. The snow protection device 200 is substantially identical to the snow protection device 100 of the previous embodiment by comprising a waterproof cloth 10, two bars 20, and two rubber magnets 30, but a difference between the instant embodiment and the first embodiment is as follows:

The instant embodiment further comprises a plurality of flexible support rods 50, which are preferably made of a soft and flexible material, such as silica gel, foam, and rubber. The flexible support rods 50 are arranged to line up in an equally spaced manner on the waterproof cloth 10 and are located between the two bars 20. The arrangement of the flexible support rods 50 spaces the waterproof cloth 10 from the automobile windshield 99 by a predetermined gap 97 at the location of each flexible support rod and keeps the waterproof cloth 10 from completely flat laid on the windshield 99. This facilitates the operation of lifting up the waterproof cloth 10.

Further, since the waterproof cloth 10 is provided with a number of flexible support rods 50, the flexible support rods 50 makes the outside surface of the waterproof cloth 10 in an irregular, corrugated configuration, namely the flexible support rods 50 making the outside contour of the waterproof cloth 10 exhibiting a number of raised ridges so that the snow 98 falling on the waterproof cloth 10 is distributed in an irregular corrugated configuration. This helps preventing the snow 98 from being hard to remove due to increased density caused by regular distribution of snow. This makes the operation of lifting up the waterproof cloth 10.

Further, the flexible support rods 50 are also each covered and retained by a piece of enclosure cloth 40, of which a circumference is mounted to the waterproof cloth 10 (by means of sewing or adhesives), so as to fix each of the flexible support rods 50 in position on the waterproof cloth 10.

Figure 5:
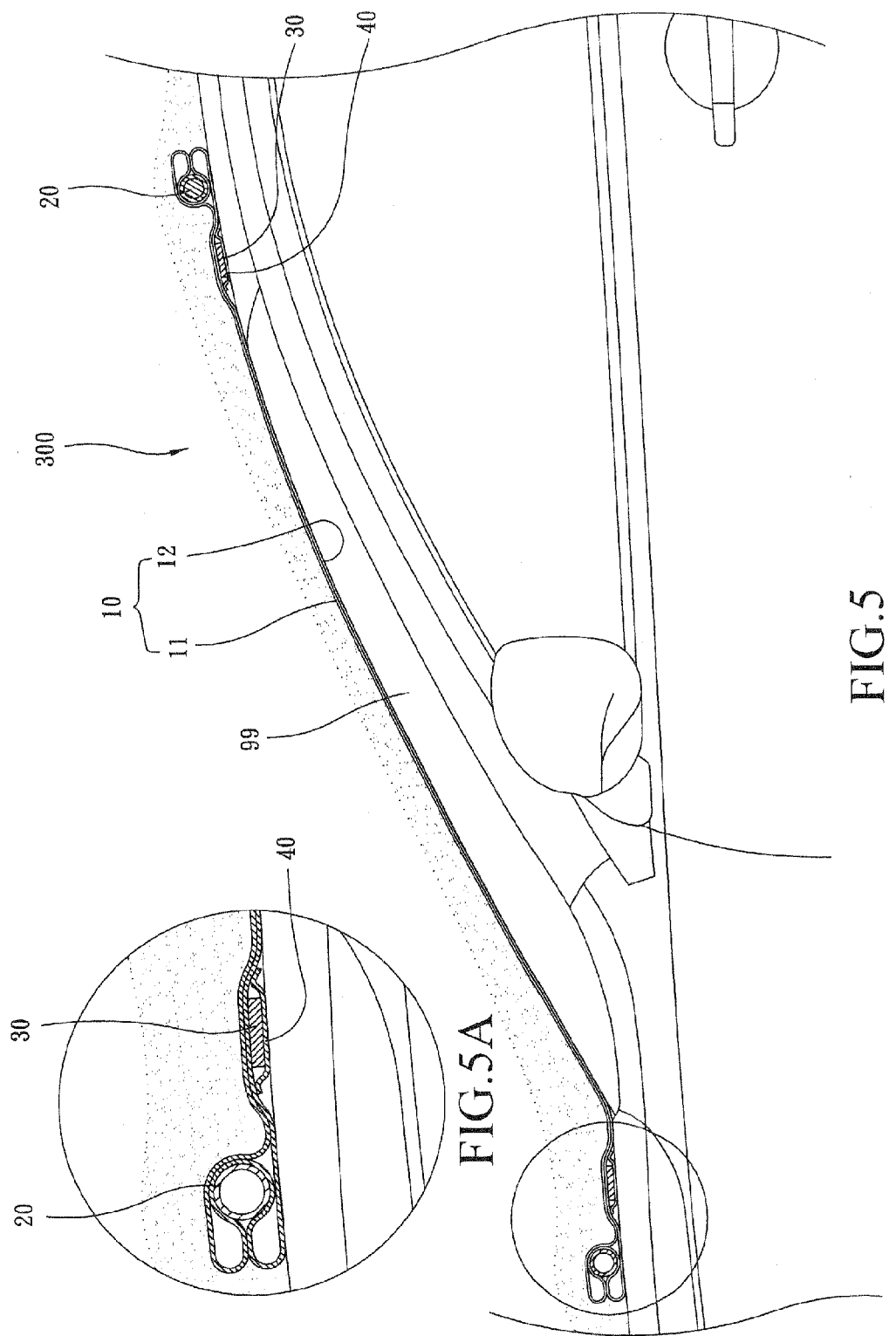
FIG. 5 is a schematic view illustrating the use of a third preferred embodiment according to the present invention.

Referring to FIGS. 5 AND 5A, a snow protection device 300 constructed in accordance with a third preferred embodiment of the present invention is shown. The snow protection device of the instant embodiment similarly comprises a waterproof cloth 10, two bars 20, two rubber magnets 30, and two pieces of enclosure cloth 40, but a difference between the instant embodiment and the first embodiment is as follows:

In the instant embodiment, the waterproof cloth 10 is of a double-layered structure comprising a top layer 11 and a bottom layer 12. The double-layered structure of the waterproof cloth 10 further improves the effect of preventing water penetration. In other words, the top layer 10 of the waterproof cloth 10 is allowed to move, such as sliding, relative to the bottom layer 12 of the waterproof cloth 10 to facilitate the operation of lifting up the waterproof cloth 10.

It is apparent that the waterproof cloth 10 can be of a three-layered structure or a multiple-layered structure that comprises more than three layers to facilitate the operation of lifting up the waterproof cloth 10.

Further, the two side edges of the waterproof cloth 10 on which the two bars 20 are arranged can be folded inwards, whereby the folded portions may raise the waterproof cloth 10 to reduce the contact surface area between the waterproof cloth 10 and the windshield 99.

Figure 6:
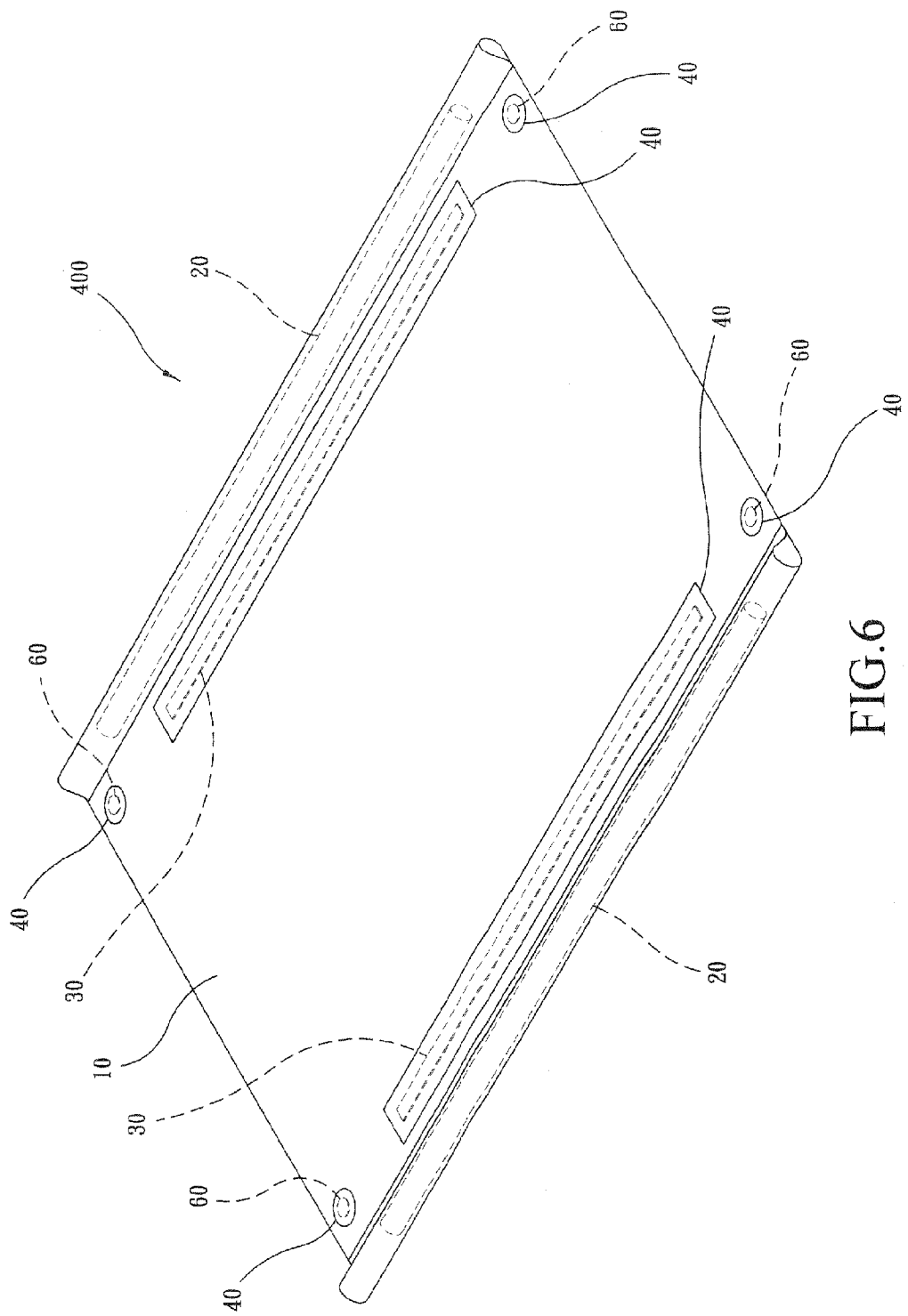
FIG. 6 is a perspective view showing a fourth preferred embodiment according to the present invention.
Figure 7:
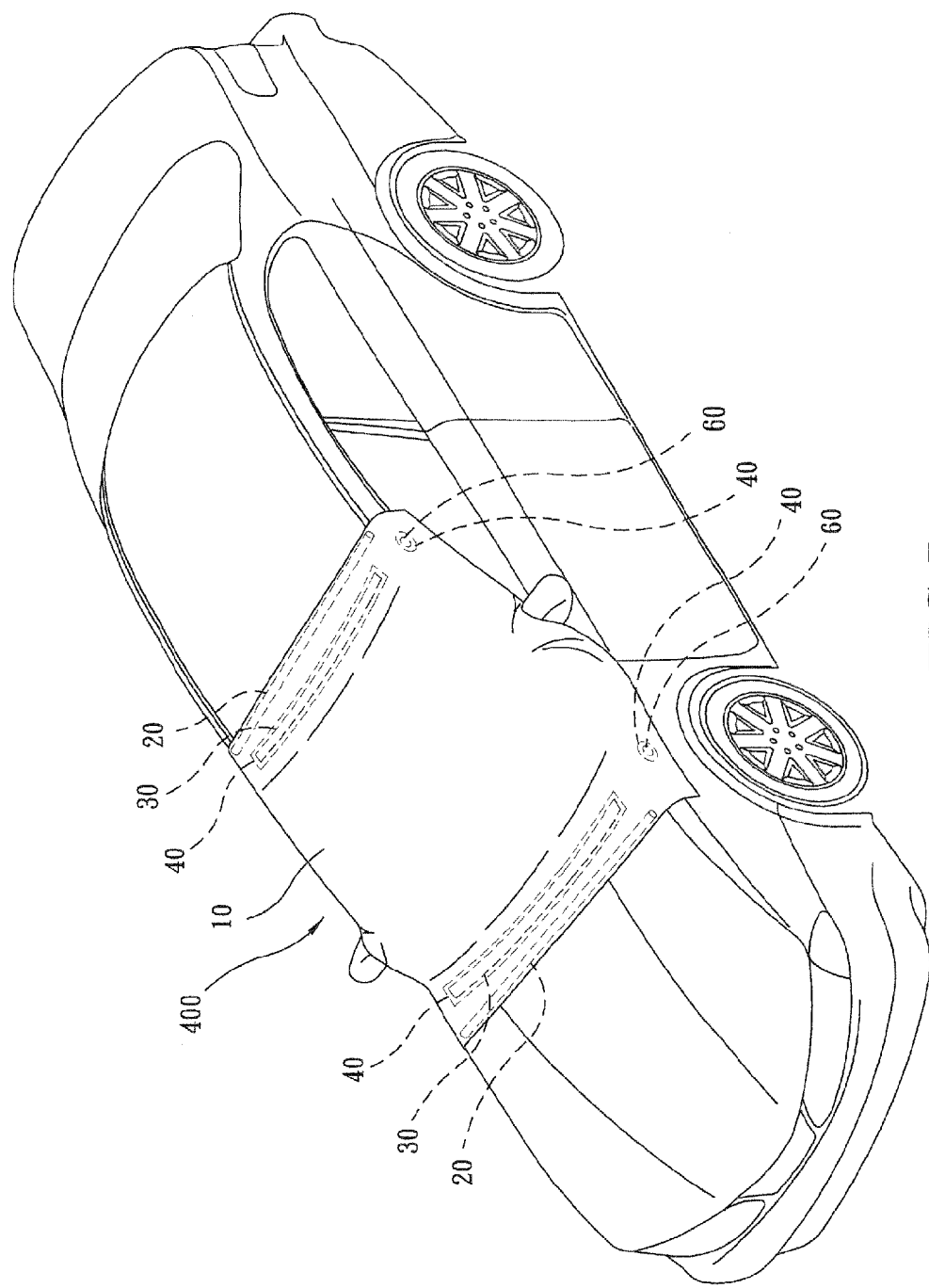
FIG. 7 is a schematic view illustrating the use of the embodiment of FIG. 6.

Referring to FIGS. 6 and 7, a snow protection device 400 constructed in accordance with a fourth preferred embodiment is shown. Similar to the previous embodiment, the snow protection device 400 comprises a waterproof cloth 10, two bars 20, two rubber magnets 30, and two pieces of enclosure cloth 40, but a difference between the instant embodiment and the first embodiment is as follows:

The instant embodiment further comprises four side rubber magnets 60, which are arranged to have every two of the rubber magnets 60 located on opposite locations at the two edges of the waterproof cloth 10 but different from the locations of the rubber magnets 30 to allow the side rubber magnets 60 to be attached, by means of the magnetic attraction, to metal parts by the windshield 99 and improve the shielding around the windshield 99.

Of course, the side rubber magnets 60 can be enclosed and retained by pieces of enclosure cloth 40.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A snow protection device adapted to be positioned outside and covering a windshield of an automobile, comprising:
    waterproof cloth, which comprises a piece of cloth that is light-weighted, windable, and is resistant against penetration of water;
    at least two bars, which are respectively mounted to opposite side edges of the waterproof cloth, the two bars being adapted to be positioned on the automobile at locations above and below the windshield of the automobile; and
    at least two rubber magnets, which are of magnetic attraction and are flexible, the rubber magnets being arranged on the waterproof cloth at locations adjacent to and by the bars, the rubber magnets being magnetically attracted and attached to metal portions of the automobile, whereby the two bars and the two rubber magnets are respectively located above and below the windshield and extend to substantially over upper and lower edges of the windshield so as to prevent snow falling on the automobile from directly contacting the windshield and also to prevent any water resulting from the snow from permeating the waterproof cloth to directly contact the windshield.

2. The snow protection device according to claim 1 further comprising a plurality of flexible support rods, which are arranged on the waterproof cloth in an equally spaced manner and between the two bars.

3. The snow protection device according to claim 1, wherein the waterproof cloth comprises a double-layered structure comprising a top layer and a bottom layer.

* * * * *